United States Patent
Bednarowski et al.

(10) Patent No.: US 10,696,459 B2
(45) Date of Patent: Jun. 30, 2020

(54) REINFORCED CABLE TIE STRAP AND METHOD OF MANUFACTURE

(71) Applicant: ABB Schweiz AG, Baden (CH)

(72) Inventors: Dariusz Bednarowski, Cracow (PL); Kathryn F. Murphy, South San Francisco, CA (US); Krzysztof Dudek, Cracow (PL)

(73) Assignee: ABB Schweiz AG, Baden (CH)

( * ) Notice: Subject to any disclaimer, the term of this patent is extended or adjusted under 35 U.S.C. 154(b) by 73 days.

(21) Appl. No.: 15/895,525

(22) Filed: Feb. 13, 2018

(65) Prior Publication Data
US 2018/0229906 A1     Aug. 16, 2018

Related U.S. Application Data

(60) Provisional application No. 62/459,676, filed on Feb. 16, 2017.

(51) Int. Cl.
*B65D 63/16* (2006.01)
*B65D 63/08* (2006.01)
(Continued)

(52) U.S. Cl.
CPC .............. *B65D 63/16* (2013.01); *B29C 48/08* (2019.02); *B29C 48/154* (2019.02); *B29C 48/30* (2019.02);
(Continued)

(58) Field of Classification Search
CPC .... Y10T 24/1498; B65D 63/16; B65D 63/08; B65D 2563/103; B29C 48/08;
(Continued)

(56) References Cited

U.S. PATENT DOCUMENTS 3,241,184 A   3/1966  Barnett
3,367,814 A   2/1968  Weiner et al.
(Continued)

FOREIGN PATENT DOCUMENTS

CN   201249930 Y   6/2009
CN   202400427     8/2012
(Continued)

OTHER PUBLICATIONS

PCT Application No. PCT/US16/27509.
Canadian Intellectual Property Office, Requisition by the Examiner issued in corresponding Canadian application No. 2,994,583, dated Dec. 13, 2018, 5 pp.
Canadian Intellectual Property Office, Requisition by the Examiner issued in corresponding Canadian application No. 2,994,583, dated Nov. 4, 2019, 6 pp.

*Primary Examiner* — Robert Sandy
(74) *Attorney, Agent, or Firm* — Taft Stettinius & Hollister LLP; J. Bruce Schelkopf

(57) ABSTRACT

A reinforced cable tie generally includes an elongate strap having a first end, a second end and an elongate planar strap body therebetween, a head having an upstanding central wall separating a first and a second elongate parallel passageway through the head for respective receipt of the first and second ends of said strap, a locking device supported in the head for retaining the first and second ends of the strap and a continuous reinforcement disposed in and extending substantially continuously along a path defining the strap. In a method for forming a cable tie, a continuous reinforcing strand is co-extruded within an elongate strap and a head is assembled to the strap.

12 Claims, 4 Drawing Sheets

(51) Int. Cl.
*B32B 27/12* (2006.01)
*B32B 27/34* (2006.01)
*B32B 37/15* (2006.01)
*B32B 5/02* (2006.01)
*B29C 48/08* (2019.01)
*B29C 48/30* (2019.01)
*B29C 48/154* (2019.01)
*B29C 48/345* (2019.01)
*B29C 47/00* (2006.01)
*B29C 47/02* (2006.01)
*B29C 47/30* (2006.01)
*B29K 101/12* (2006.01)
*B29K 105/10* (2006.01)
*B29C 48/285* (2019.01)

(52) U.S. Cl.
CPC .......... *B29C 48/345* (2019.02); *B32B 5/02* (2013.01); *B32B 27/12* (2013.01); *B32B 27/34* (2013.01); *B32B 37/153* (2013.01); *B65D 63/08* (2013.01); *B29C 48/2883* (2019.02); *B29K 2101/12* (2013.01); *B29K 2105/106* (2013.01); *B32B 2262/101* (2013.01); *B32B 2305/08* (2013.01); *B32B 2307/54* (2013.01); *B32B 2307/548* (2013.01); *B32B 2315/085* (2013.01); *B32B 2377/00* (2013.01); *B32B 2553/00* (2013.01); *B65D 2563/103* (2013.01)

(58) Field of Classification Search
CPC ..... B29C 48/30; B29C 48/154; B29C 48/345; B29C 48/2883; B32B 5/02; B32B 27/12; B32B 27/34; B32B 37/153; B32B 2262/101; B32B 2305/08; B32B 2307/54; B32B 2307/548; B32B 2315/085; B32B 2377/00; B32B 2553/00; B29K 2105/106; B29K 2101/12

See application file for complete search history.

(56) References Cited

U.S. PATENT DOCUMENTS

| | | |
|---|---|---|
| 3,913,179 A | 10/1975 | Rhee |
| 3,979,493 A | 9/1976 | Cameron et al. |
| 4,394,338 A | 7/1983 | Fuwa |
| 4,588,538 A | 5/1986 | Chung et al. |
| 4,599,126 A | 7/1986 | Duffield |
| 5,096,645 A | 3/1992 | Fink |
| 5,268,050 A | 12/1993 | Azari |
| 5,595,696 A | 1/1997 | Schlarb et al. |
| 5,779,961 A | 7/1998 | Teutsch |
| 5,976,627 A | 11/1999 | Wynne |
| 6,128,809 A | 10/2000 | Khokhar |
| 6,863,855 B2 | 3/2005 | Shilale |
| 7,402,268 B2 | 7/2008 | Boissonnat et al. |
| 7,730,592 B2 | 6/2010 | Krisel |
| 8,230,555 B2* | 7/2012 | Browne .......... B65D 63/1027 24/16 PB |
| 2003/0057590 A1 | 3/2003 | Loher et al. |
| 2004/0098841 A1 | 5/2004 | Crosby et al. |
| 2012/0180270 A1 | 7/2012 | Marmelstein |
| 2013/0298353 A1 | 11/2013 | Drane et al. |
| 2014/0020229 A1 | 1/2014 | Moore |
| 2014/0059809 A1* | 3/2014 | Gao .......... B65D 63/10 24/16 PB |
| 2015/0064437 A1 | 3/2015 | Luo et al. |
| 2015/0101152 A1* | 4/2015 | Gao .......... B65D 63/1027 24/16 PB |
| 2018/0282037 A1* | 10/2018 | Zant .......... B65D 63/1072 |

FOREIGN PATENT DOCUMENTS

| | | |
|---|---|---|
| CN | 203497387 U | 3/2014 |
| WO | WO0124993 | 4/2001 |

* cited by examiner

REINFORCED CABLE TIE STRAP AND METHOD OF MANUFACTURE

CROSS-REFERENCE TO RELATED APPLICATIONS

This application claims priority from U.S. provisional application Ser. No. 62/459,676, filed on Feb. 16, 2017, the specification of which is incorporated herein in its entirety for all purposes.

TECHNICAL FIELD

The present invention relates to cable ties having improved mechanical strength and creep resistance. More particularly, the present invention is directed to a strap for a cable tie having a continuous reinforcement co-extruded with the strap.

BACKGROUND

A cable tie or tie-wrap, also known as a hose tie, zap-strap or zip tie, is a type of fastener for holding items together, such as electric cables or wires. Because of their low cost and ease of use, tie-wraps are ubiquitous, finding use in a wide range of other applications. Stainless steel versions, either naked or coated with a rugged plastic, cater to exterior applications and hazardous environments.

The common tie-wrap, normally made of nylon, has a strap section with teeth that engages with a pawl in a head to form a ratchet so that, as the free end of the strap is pulled, the tie-wrap tightens and does not come undone. Another version of the tie-wrap allows a tab to be depressed to either adjust the tension or remove the tie-wrap. Another popular design of the cable tie locking mechanism involves a metallic barb in the head slot. The metallic, e.g. stainless steel, barb is inserted after the plastic part is molded. The barb engages and cuts into the strap surface to lock the strap in place when fastened.

Another prior-art design of a tie-wrap is assembled from a plastic strap component and a double lock head component. The plastic strap is extruded continuously and the head is fabricated separately and subsequently assembled to the strap. The double lock head has two slots with a metal barb in each slot to lock the plastic strap inserted into the head. The plastic material in this design is typically acetal.

This separate head and strap design is favored by industries, such as telecommunications, for securing large bundles of cables. The customer purchases strap material supplied on a reel, cuts a strap to a desired length, and secures the cut length of strap with a separate locking head comprising two metal barbs within a plastic housing.

A typical requirement for cable ties, in addition to, for example, chemical resistance to common automotive fluids, is that a fastened cable tie should withstand prolonged exposure to elevated temperatures, (e.g. at 125° C.), if it is to be applied, for example, in or in the vicinity of the engine compartment. At the same time, such a cable tie should show good mechanical strength at low, (e.g. sub-zero), temperatures. For such high-end applications, cable ties are often molded from a polyamide composition, (e.g. a plasticized polyamide 11 composition, an elastomer-modified polyamide 66 composition, etc.). Acetal material is also used to extrude cable tie straps and injection mold cable tie heads separately due to its relatively inferior processability.

A cable tie has several typical failure mechanisms. First, the cable tie strap can break when the fastening load is beyond the material strength limit. Another failure mechanism involves the unlocking of the strap from the cable tie head slot, whether the cable tie uses a plastic pawl or a metallic barb. Still another failure relates to creep, leading to loosening of cable bundles over time. Each failure mechanism can cause a cable tie to fail before reaching its designated loop tensile strength rating.

Since the original invention of the cable tie in 1958, many follow-up patents have emerged that mainly focus on improved manufacturing methods, new materials, or special applications. For example, for applications requiring high strength, stiffness, and environmental resistance, stainless steel cable ties have been developed. However, in many applications a nonmetallic solution is desired. Moreover, such stainless steel cable ties can be sharp, heavy, and may interfere with RF signals.

In such applications, more recent patents focus on reinforcing of the polymer matrix with graphene. Another prior art method of reinforcement involves introducing strengthening fibers into the raw plastic material prior to molding the cable tie. However, such reinforced plastics, when bought from a material supplier, tend to have a higher price than unreinforced plastics due to the additional step of compounding required during their manufacture. Such materials will furthermore increase the overall stiffness of the cable tie, rendering it incapable of being easily bent to form a loop.

It is also known from commonly owned PCT Application No. PCT/US16/27509 to form cable ties with a continuous glass reinforcing fiber positioned within the strap and/or head during an injection molding process. However, injection molding over glass fibers can be difficult to implement in a factory.

Accordingly, it would be desirable to provide a simple, inexpensive method for reinforcing the strength of a cable tie.

SUMMARY

In one aspect of the present invention, a reinforced cable tie strap is provided, wherein the cable tie strap is co-extruded with a continuous reinforcement throughout the whole body. In another aspect of the invention, a manufacturing method for providing reinforcement of a standard cable tie is provided. This type of reinforcement allows for a whole family of polymer matrices to be used.

The reinforced cable tie strap forms part of a cable tie including a head having an upstanding central wall separating a first and second elongate parallel passageways through the head for respective receipt of a first and a second end of the strap and a locking device supported by the central wall, wherein the locking device is configured to permit the first and second ends of the strap to be respectively inserted through the first and second passageways of the head in a first direction and being further configured to prevent movement of the first and second ends of the strap from the respective head passageways in a second direction opposite said first direction.

The continuous reinforcement may comprise a glass fiber or a steel strand. The continuous reinforcement may comprise glass, aramid, carbon, metal, basalt, polybenzimidazole, natural fibers, or any combination thereof. The continuous reinforcement may comprise bundles of filaments, twisted cords, twisted ropes, single filaments, woven sheets, tapes, or meshes. The continuous reinforcement may further comprise structures with ladder-like or perforated sheet geometry and may also be made of carbon nanotubes or graphene.

The strap may comprise any thermoplastic material, such as nylon, acetal, or polypropylene. The percentage by weight of the continuous reinforcement content with respect to the strap is preferably between 1% and 30%.

The head is separately attachable to the strap. This can occur during installation of the cable tie or the head can also be attached to one side in the factory.

The overall thickness of the strap and the continuous reinforcement disposed therein is preferably between 0.3 mm and 3 mm and the continuous reinforcement is preferably disposed centrally within the strap.

In another aspect of the present invention, a method for forming a cable tie is provided. The method generally includes co-extruding a continuous reinforcing strand within an elongate strap and assembling a head to the strap, wherein the head has an upstanding central wall separating a first and a second elongate parallel passageway through the head for respective receipt of a first and second ends of said strap and a locking device supported by said central wall, said locking device being configured to permit said first and second ends of said strap to be respectively inserted through said first and second passageways of said head in a first direction and being further configured to prevent movement of said first and second ends of said strap from said respective head passageways in a second direction opposite said first direction.

The step of co-extruding preferably includes conveying the continuous reinforcing strand through a first passage of a first die part of a co-extrusion die, injecting a thermoplastic through a second passage of the first die part of the co-extrusion die such that the injected thermoplastic encapsulates the continuous reinforcing strand and passing the injected thermoplastic with the continuous reinforcing strand encapsulated therein through a passage of a second die part of the co-extrusion die, wherein the second die part forms the final profile of the strap.

The second passage of the first die part is preferably configured for injecting the thermoplastic at a finite angle with respect to the continuous reinforcing strand. The first and second passages of the first die part are also preferably configured to centrally dispose the continuous reinforcing strand within the strap.

In another method for forming a cable tie, continuous fibers are co-extruded with a plastic material to form a strip with continuous fibers incorporated along its length and a cable tie is subsequently formed by compression molding of the strip or by supporting the strip in a mold cavity of a mold. The mold cavity has a size and shape of a cable tie including a head having an aperture.

As a result of either method, a cable tie with continuous reinforcements located at or near the center plane of the strap is provided. The reinforcements make the strap much stronger and more creep resistant than an unreinforced strap. By locating the reinforcements at the center plane, the strap remains compliant in bending so that a user can form a loop. Both methods ensure the reinforcements are correctly placed during the extrusion process.

The present invention provides substantial business benefits. For example, the method of the present invention achieves the reinforcement during the manufacture of the cable tie strap and thus eliminates one step during material production.

Also the invention bears great flexibility in the sense that it works with many different polymer matrices and types of fibers and therefore can be applied in many different market segments.

Features of the disclosure will become apparent from the following detailed description considered in conjunction with the accompanying drawings. It is to be understood, however, that the drawings are designed as an illustration only and not as a definition of the limits of this disclosure.

DETAILED DESCRIPTION OF PREFERRED EMBODIMENTS

Figure 1:
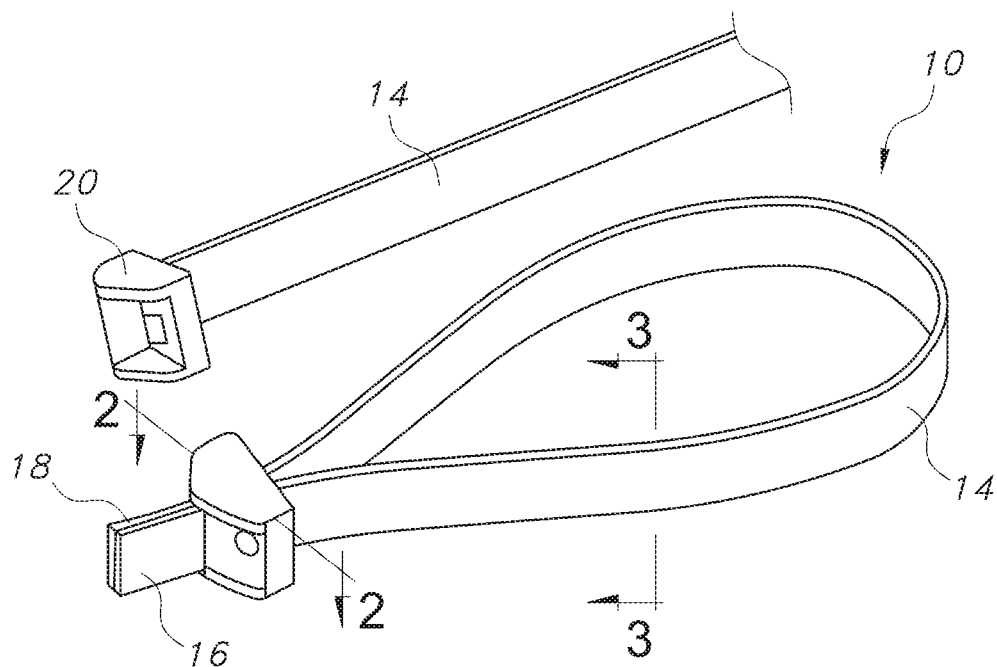
FIG. 1 is a perspective view of two cable ties according to the present invention.
Figure 2:
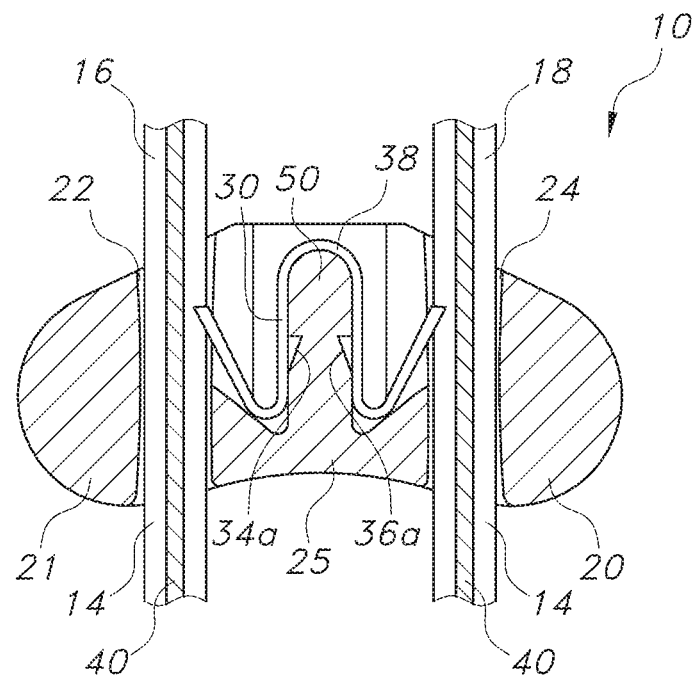
FIG. 2 is a cross-sectional view of one of the cable ties shown in FIG. 1, taken along line 2-2.

Referring first to FIGS. 1 and 2, the cable tie assembly 10 of the present invention is designed to be looped around a plurality of electrical cables or similar articles which are formed in a bundle (not shown). The cable tie assembly 10 is a two-piece member formed of a high strength material and is suitable for both indoor and outdoor use.

The two-piece construction of cable tie assembly 10 includes an elongate generally planar cable tie strap 14 having opposed ends 16 and 18 which are designed to be looped around the cable bundle. The cable tie strap 14 typically has a generally rectangular cross-sectional configuration, although other shapes may be employed.

The ends 16 and 18 of strap 14 may be secured within a separately formed head 20 of the cable tie assembly 10. The head 20 includes a body 21 having a pair of spaced apart side-by-side parallel passageways 22 and 24 extending therethrough for accommodating respectively the ends 16 and 18 of strap 14 when inserted in the direction of arrow A defining an insertion direction. The body 21 includes a central supporting structure 25, which supports a strap locking device 30.

The locking device 30 is supported by the central supporting structure 25 and includes a body having a central joining section 38 and a pair of parallel walls 34a and 36a extending from the joining section. The locking device is an integrally formed metallic member preferably formed of a copper alloy exhibiting sufficient rigidity yet is relatively resiliently deflectable. The locking device further includes a first barb extending from one of the wall members into the first passageway and a second barb extending from the other wall member into the second passageway. The barbs are provided for independent deflectable locking engagement with the first and second strap ends upon insertion into the passageways. A typical head, including locking device, for use with the strap 14 of the present invention is shown and described in commonly owned U.S. Pat. No. 6,128,809, the specification of which is incorporated herein in its entirety for all purposes.

Referring specifically to FIG. 2, and as will be described in further detail below, a continuous reinforcement structure 40 is provided in the strap 14 as a result of a co-extrusion process according to the present invention. The continuous reinforcement structure 40 is co-extruded along the full length of the strap 14.

In one aspect of the present invention, straps can be formed with multiple strands of glass fibers (1200 tex). Thus, for example, FIG. 3a shows a cross-section of a strap 14a with 8 strands of glass fiber 40a.

In another aspect of the present invention, straps can be formed with multiple ropes of steel. Thus, for example, FIG. 3b shows a strap 14b with 6 ropes of steel 40b (1×7 construction with overall diameter 0.63 mm).

In still another aspect of the present invention, straps can be formed with a reinforcing layer made from fiber or metallic materials. Thus, for example, FIG. 3c shows a strap 14c with a pressed glass fiber fabric sheet 40c.

Figure 3A:
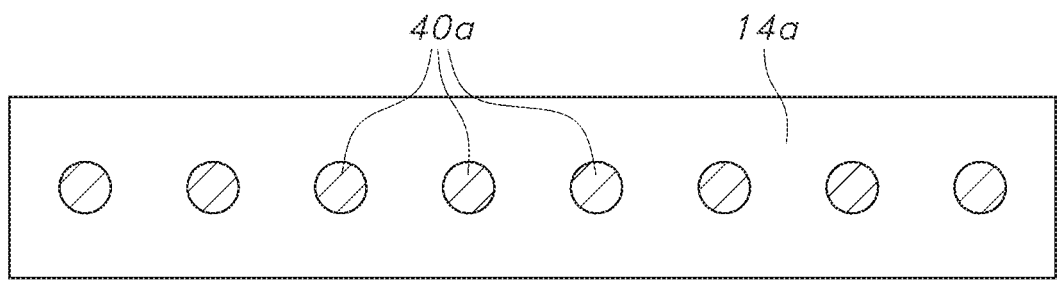
FIGS. 3a, 3b and 3c are respective cross-sectional views of alternative embodiments of one of the cable straps shown in FIG. 1, taken along line 3-3.
Figure 3B:
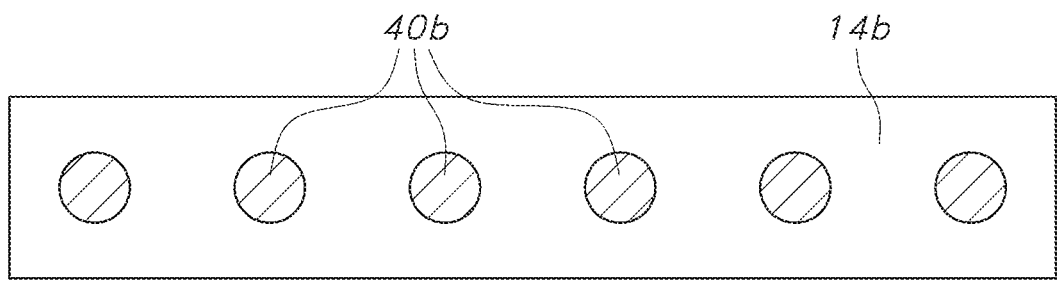
Figure 3C:
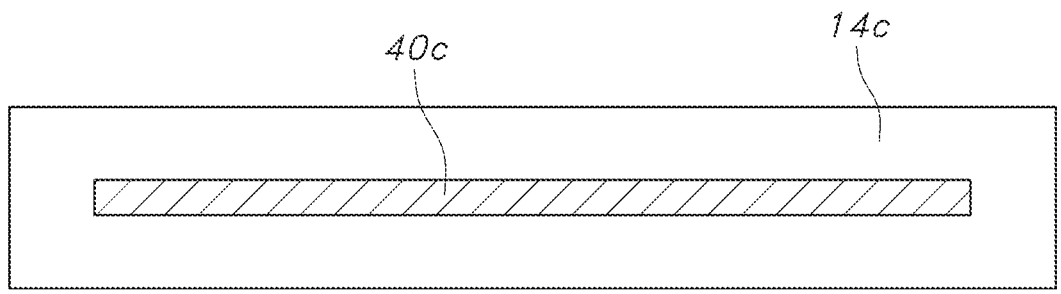

In each of the embodiments shown in FIGS. 3a, 3b and 3c, the base material matrix of the strap is nylon (PA66), though it would be straightforward to use other thermoplastics to suit the application. However, changes to the reinforcements 40a, 40b, 40c may require changes to the die, (described later below).

The placement of the reinforcements inside the strap is not trivial. Typical glass fiber reinforced plastic articles have a nominally homogeneous distribution of fibers. To accurately position the reinforcements, the present invention provides a process wherein the plastic material is extruded above and below the reinforcing strands, which are pulled through the extrusion die crosshead. This co-extrusion of plastic and reinforcing strands requires the application of a special die and crosshead designed for the strand material and cross section.

Figure 4:
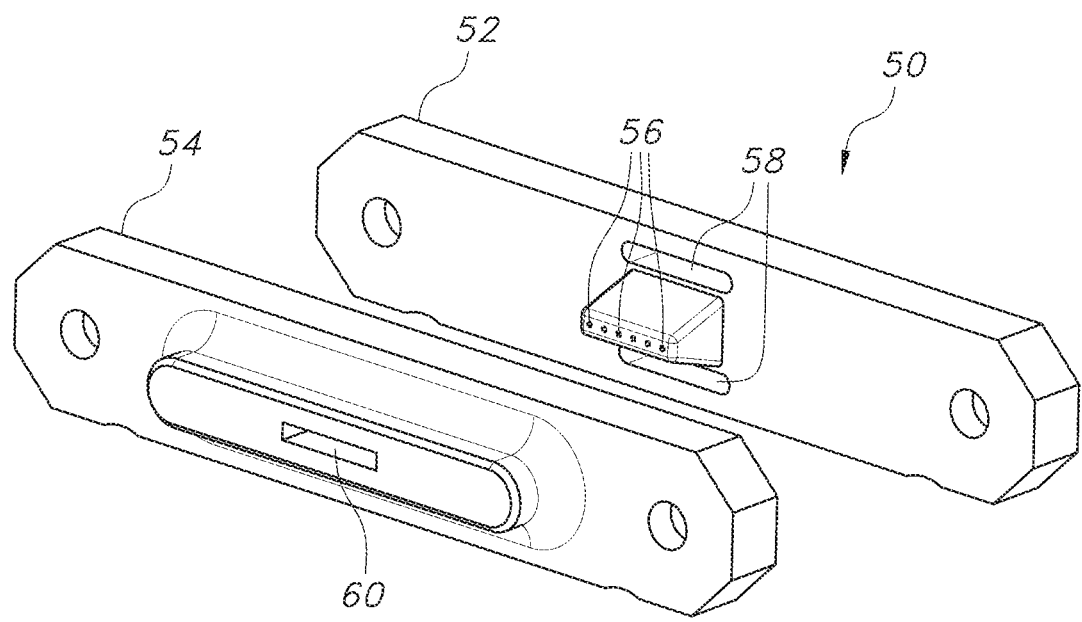
FIG. 4 is a perspective view of a die set for forming a cable tie strap in accordance with the present invention.
Figure 5:
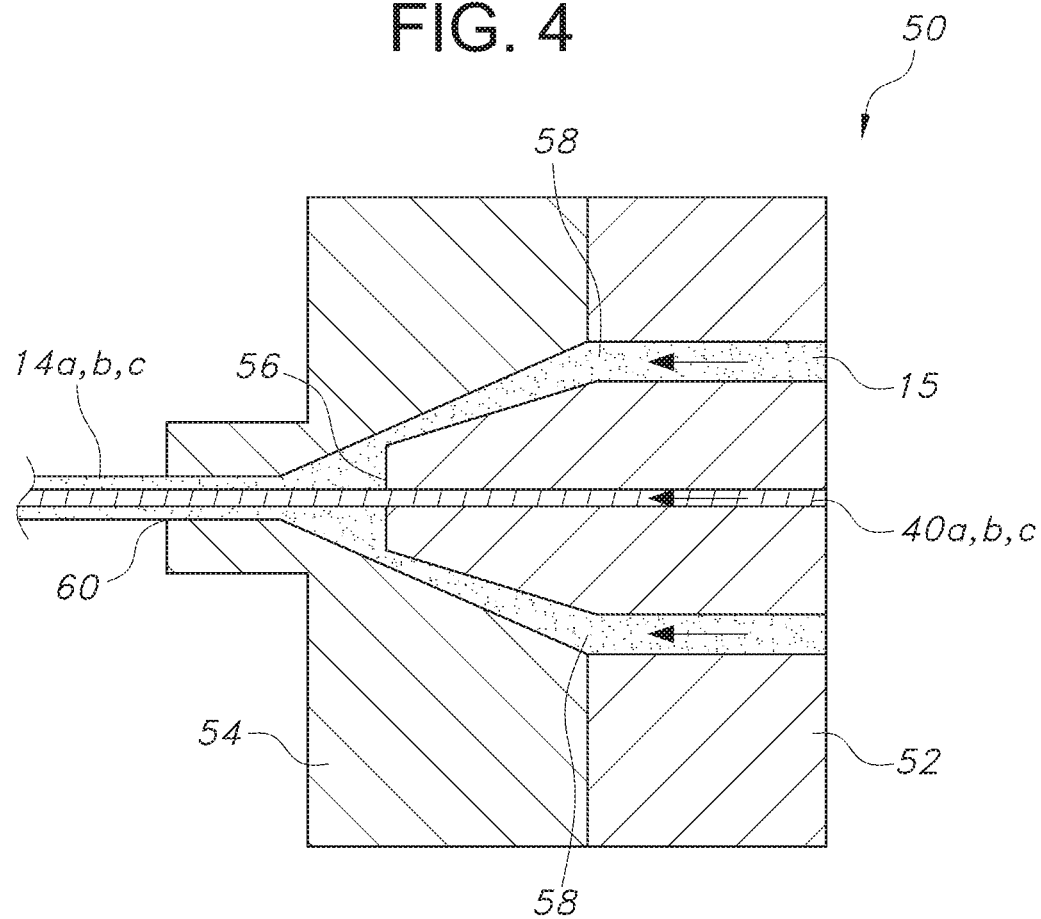
FIG. 5 is a cross-sectional view of the die set shown in FIG. 4 assembled and in use according to a method of the present invention.

Turning now to FIGS. 4 and 5, the co-extrusion die 50 of the present invention generally includes two parts 52, 54. The first part 52 has a centrally located channel or channels 56 to allow passage of the reinforcements 40a,b,c, with separate channels 58 on opposite sides of the reinforcement channels to allow for passage of the plastic melt 15. The channels 58 for the plastic melt should preferably be of equal cross sections. The second part 54 of the die is a typical standard extrusion die having an exit channel 60, which forms the final profile of the cable tie strap 14a,b,c.

Figure 6:
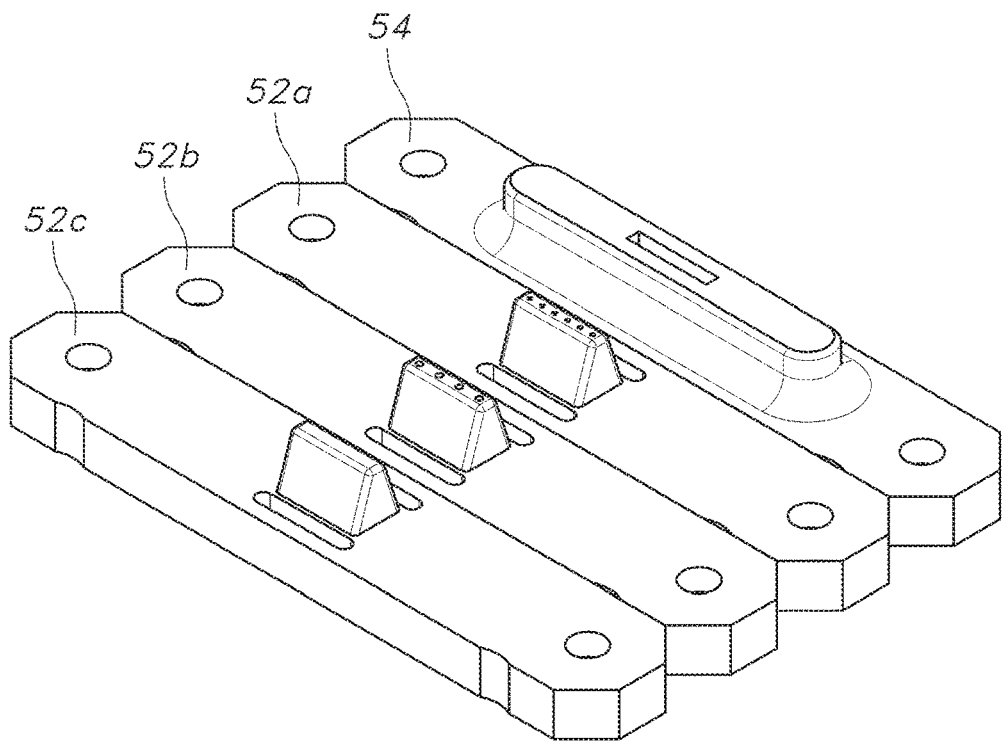
FIG. 6 is a perspective view of several embodiments of the die set according to the present invention.
Figure 7:
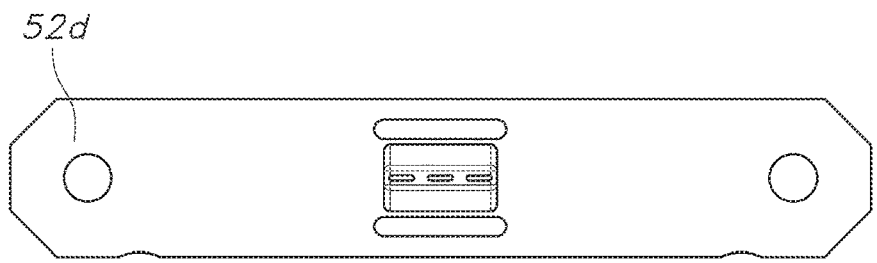
FIG. 7 is a plan view of an alternative embodiment of one part of the die set according to the present invention.

FIGS. 6 and 7 show several variations of the first part of the die in the form of a six strand die 52a, a four strand die 52b, a no strand die 52c and a three flat strand die 52d. Also shown in FIG. 5 is the second part 54 of the die termed a "final profile" die.

In the case of glass fiber or other delicate reinforcements, the die should be heat treated and polished, and edges should be rounded to avoid filament breakage. Separate channels could be used for each strand, or a single wide channel for all strands. A tapered channel which becomes narrower toward the outlet is preferred to reduce friction on the strands.

The crosshead should allow for extrusion in a direction not parallel to the cylinder's axis. This allows for the reinforcements to enter and leave the crosshead without having to turn a corner inside the head. Since the plastic melt is liquid, the precise angle at which it enters and leaves the crosshead is relatively unimportant.

The strap extruded in this manner will typically be wound on a reel for later use as part of a cable tie. When needed, the strap is unwound from the reel and a suitable length is cut. A head is then fastened to the cut length to form a cable tie, as described above. However, given the reinforcing structure extruded centrally within the strap, care must be taken when fastening the head to avoid cutting or otherwise damaging the reinforcing structure. A specially designed head for use with co-extruded straps of the present invention is preferably provided.

Glass fiber roving and steel ropes have been demonstrated, but other materials and forms should be considered. Of particular interest are metal meshes and twisted glass cords. Moreover, the reinforcements can be pre-treated with various coatings to improve adhesion with the matrix. Also, it is conceivable that the reinforcing glass strands can be impregnated with a polymer to form a tape, and then have plastic extruded on either side. Reinforcing strands could also be "worked" when inside the plastic melt to improve impregnation. This could be done by running the fibers over rollers or around pins within the melt.

The term "continuous fiber" is used herein to refer to a reinforcing strand, or roving, or filament structure that is contiguous and unbroken along its length extending along a desired path. Unlike fiber reinforcing methods of the past, the continuous fiber is placed in the cable tie only where needed. Suitable materials for the continuous fiber include glass, aramid, carbon, metal, basalt, polybenzimidazole, natural fibers, etc.

For the polymer matrix, different thermoplastic materials suitable for extrusion could be used, (e.g., PA, POM, PBT, ETFE, PP, etc.). Thus, suitable base plastics include, but are not limited to, polyamide (e.g., nylon), polypropylene, polycarbonate, poly(ethylene tetrafluoroethylene), polyetheretherketone, poly(ethylene and chlorotrifluoroethylene), polyvinyl chloride, polyimide, polysulfone, and combinations of two or more thereof. Suitable base plastic materials may also include thermosets. In one embodiment, the base plastic is polypropylene. In one embodiment, the base plastic is polyamide. In one embodiment, the base plastic is polyamide 6 (i.e., nylon 6). In one embodiment, the base plastic is polyamide 6,6 (i.e., nylon 6,6). In one embodiment, base plastic is polyamide 6,6 loaded at between about 90-100 phr. In one embodiment, polyamide 6,6 is loaded at about 100 phr. In one embodiment, polyamide 6,6 loaded at about 100 phr is a medium impact modified compound with embedded process aid. In one embodiment, polyamide 6,6 loaded at about 100 phr is an unfilled resin with embedded process aid.

As a result of the present invention, a continuous cable tie strap comprising an extruded thermoplastic with continuous reinforcing strands embedded near the center plane is provided. The strap itself is significantly stronger and more creep resistant than an unreinforced strap. By placing the reinforcements close to the center plane rather than distributing them throughout the cross section, the strap is stronger and stiffer in tension, yet still compliant in bending so that it can easily form a loop.

Thus, a tailored reinforced cable tie is provided having the following benefits: 1) Improved form stability at higher temperatures; 2) Lower tendency to creep; 3) Increased light-weight potential due to high weight-specific mechanical properties; 4) Wider choices of plastic materials, e.g. with lower mechanical properties/cost; 5) Improved cable tie structural integrity by reducing the chance for a plastic pawl to yield or break.

It should be apparent to those skilled in the art that the described embodiments of the present invention provided herein are illustrative only and not limiting, having been presented by way of example only. As described herein, all features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. While various embodiments of the present invention are specifically illustrated and/or described herein, it will be appreciated that modifications and variations of the present invention may be effected by those skilled in the art without departing from the spirit and intended scope of the invention.

All documents, patents and other literature referred to herein are incorporated by reference in their entirety.

The term "comprising" as may be used in the following claims is an open-ended transitional term that is intended to include additional elements not specifically recited in the claims. The term "consisting essentially of" as may be used in the following claims is a partially closed transitional phrase and is intended to include the recited elements plus any unspecified elements that do not materially affect the basic and novel characteristics of the claims. For example, the cable tie may be embossed or printed with indicia and still be included in the meaning of "consisting essentially of", even if not specifically recited. The term "consisting of" as may be used in the following claims is intended to indicate that the claims are restricted to the recited elements.

It should be noted that it is envisioned that any feature, element or limitation that is positively identified in this document may also be specifically excluded as a feature, element or limitation of an embodiment of the present invention.

What is claimed is:

1. A cable tie comprising:
   an elongate strap having a first end, a second end and an elongate planar strap body therebetween;
   a head having an upstanding central wall separating a first and a second elongate parallel passageway through said head for respective receipt of said first and second ends of said strap;
   a locking device supported by said central wall, said locking device being configured to permit said first and second ends of said strap to be respectively inserted through said first and second passageways of said head in a first direction and being further configured to prevent movement of said first and second ends of said strap from said respective head passageways in a second direction opposite said first direction; and
   a continuous reinforcement disposed in and extending substantially continuously along a path defining said strap,
   wherein said head comprises a continuous fiber reinforcement structure and is separately attachable to said strap.

2. The cable tie as defined in claim 1, wherein said continuous reinforcement is co-extruded with said strap.

3. The cable tie as defined in claim 1, wherein said continuous reinforcement comprises a glass fiber.

4. The cable tie as defined in claim 1, wherein said continuous reinforcement comprises a metallic strand.

5. The cable tie as defined in in claim 1, wherein said continuous reinforcement is disposed centrally within said strap.

6. The cable tie as defined in claim 1, wherein said continuous reinforcement comprises glass, aramid, carbon, metal, basalt, polybenzimidazole, natural fibers, carbon nanotubes, graphene, or any combination thereof.

7. The cable tie as defined in claim 1, wherein said continuous reinforcement comprises bundles of filaments, twisted cords, twisted ropes, single filaments, woven sheets, tapes, meshes, ladder-like structures or perforated sheets.

8. The cable tie as defined in claim 1, wherein said head is attachable to said strap during installation of the cable tie.

9. The cable tie as defined in claim 1, wherein said strap comprises an extrudable thermoplastic.

10. The cable tie as defined in claim 9, wherein said extrudable thermoplastic comprises nylon, acetal, or polypropylene.

11. The cable tie as defined in claim 1, wherein a percentage by weight of said continuous reinforcement content with respect to said strap is between 1% and 30%.

12. The cable tie as defined in claim 1, wherein the overall thickness of the strap and the continuous reinforcement disposed therein is between 0.3 mm and 3 mm.

* * * * *